United States Patent [19]

Suda

[11] Patent Number: 4,874,230
[45] Date of Patent: Oct. 17, 1989

[54] ZOOM LENS WITH A VARIABLE POWER LENS ELEMENT

[75] Inventor: Shigeyuki Suda, Yokohama, Japan

[73] Assignee: Canon Kabushiki Kaisha, Tokyo, Japan

[21] Appl. No.: 3,461

[22] Filed: Jan. 15, 1987

[30] Foreign Application Priority Data

Jan. 28, 1986 [JP] Japan ............................. 61-016512

[51] Int. Cl.$^4$ ......................... G02B 15/15; G02B 9/64
[52] U.S. Cl. ..................................... 350/423; 350/413
[58] Field of Search ................................ 350/423, 413

[56] References Cited

U.S. PATENT DOCUMENTS 3,161,718  12/1964  De Luca .
4,196,968   4/1980  Itoh ................................... 350/423
4,215,914   8/1980  Muchel et al. ................... 350/413
4,407,567  10/1983  Michelet et al. .
4,444,471   4/1984  Ford, Jr. et al. .
4,514,048   4/1985  Rogers .
4,679,913   7/1987  Sato et al. ........................ 350/423
4,682,860   7/1987  Tanaka et al. .................... 350/423
4,783,155  11/1988  Imataki et al. ................... 359/423

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens which is provided with a forward unit comprising a positive lens unit and a rearward unit comprising a lens unit including a variable surface shape element the shape of at least one surface of which is variable and wherein from the wide angle end to the telephoto end, the forward unit and the rearward unit are both moved from the image surface side to the object side and at the same time, the radius of curvature of the variable surface shape element is varied, and when the power of the rearward unit at the wide angle end is $\phi 2$ and the power of the rearward unit at the telephoto end is $\phi 2 + \Delta\phi 2$, $\Delta\phi 2$ is negative.

6 Claims, 16 Drawing Sheets

ZOOM LENS WITH A VARIABLE POWER LENS ELEMENT

BACKGROUND OF THE INVENTION

1. Field of the Invention

This invention relates to a zoom lens system, and in particular to a compact zoom lens system suitable for a lens shutter camera.

2. Description of the Prior Art

The embodiments described in Japanese Laid-Open Patent Application No. 128911/1981 (U.S. Pat. No. 4,682,860) are known as zoom lens systems proposed for such use. Each of these is comprised of a first lens unit comprising a positive lens unit and a second lens unit comprising a negative lens unit, and has been designed such that from the wide angle end to the telephoto end, each unit is moved from the image surface side toward the object side to thereby change the focal length of the entire system and keep the image surface constant. That is, they have been so constructed that a magnification change is accomplished by movement of the second negative lens unit and correction of the position of the image surface is accomplished by movement of the first positive lens unit. Generally, as a feature of such construction, the full optical length of the telephoto end which is the maximum dimension of the entire system is substantially determined by the amount of movement of the second negative lens unit.

Accordingly, for the compactness of the lens system which has been increasingly desired in recent years, it is desirable to shorten the focal length of the second negative lens unit and reduce the amount of movement of the second negative lens unit. However, taking such measures has led to the disadvantages that as the imaging performance of the lens system, the fluctuations of spherical aberration, coma and astigmatism during zooming increase and that the system difference type distortion occurring in the entire zoom range becomes great. Accordingly, it has been a difficult task to make the lens system more compact without deteriorating the imaging performance thereof. On the other hand, as new forms of the zoom lens, variable focal length lenses are proposed in Japanese Laid-Open Patent Application Nos. 10618/1984, 116710/1984, 116711/1984 and 116712/1984. However, there has been made no proposal as to a power arrangement suitable particularly for a zoom lens system for a lens shutter camera and it has been difficult to obtain any specific construction in the aforementioned propositions.

On the other hand, an optical system using a lens whose surface shape, particularly curvature, is variable is proposed in Japanese Laid-Open Patent Application No. 101618/1984 or U.S. application Ser. No. 737,342.

SUMMARY OF THE INVENTION

It is an object of the present invention to keep the quality of image good and yet expedite the compactness of a zoom lens.

It is another object of the present invention to provide a compact zoom lens suitable for a thin type lens shutter camera.

DESCRIPTION OF THE PREFERRED EMBODIMENTS

Figure 1A:
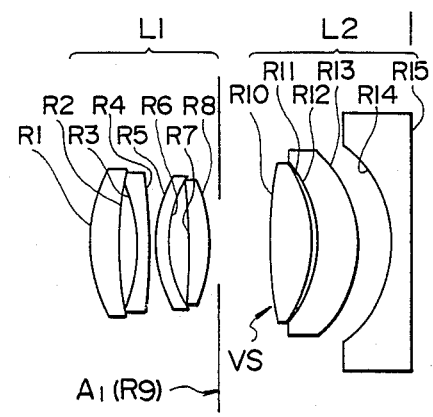
FIGS. 1A, 1B, 3A, 3B, 5A, 5B, 7A and 7B are cross-sectional views of lenses according to Embodiments 1, 2, 3 and 4, respectively, of the present invention.
Figure 1B:
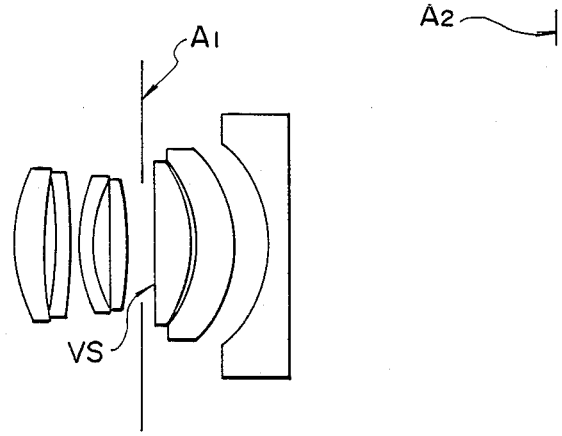
Figure 2A:
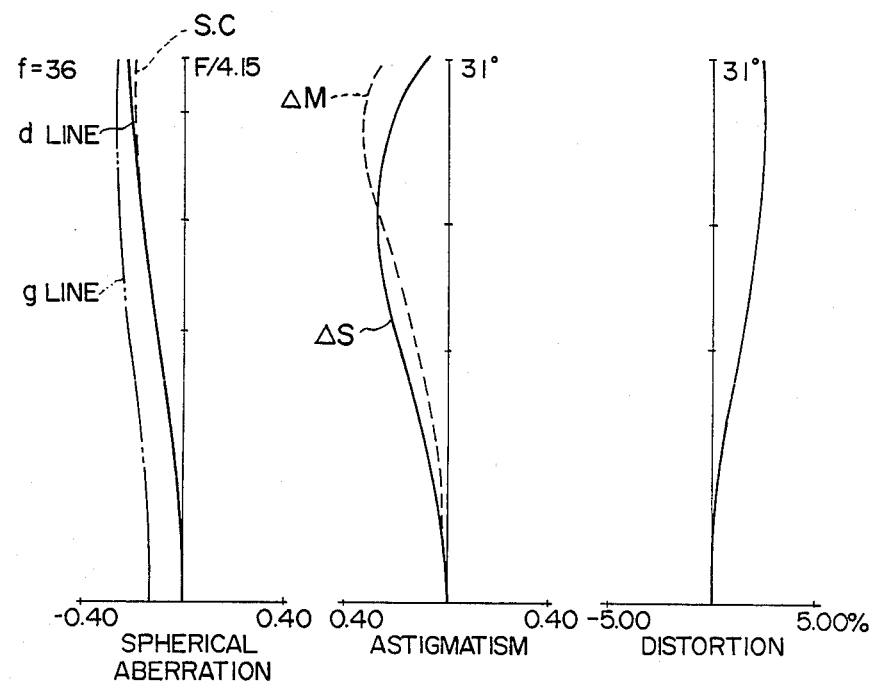
FIGS. 2A, 2B, 2C, 4A, 4B, 4C, 6A, 6B, 6C, 8A, 8B, and 8C show the various aberrations of Embodiments 1, 2, 3 and 4, respectively, at the wide angle end, the intermediate and the telephoto end.
Figure 2B:
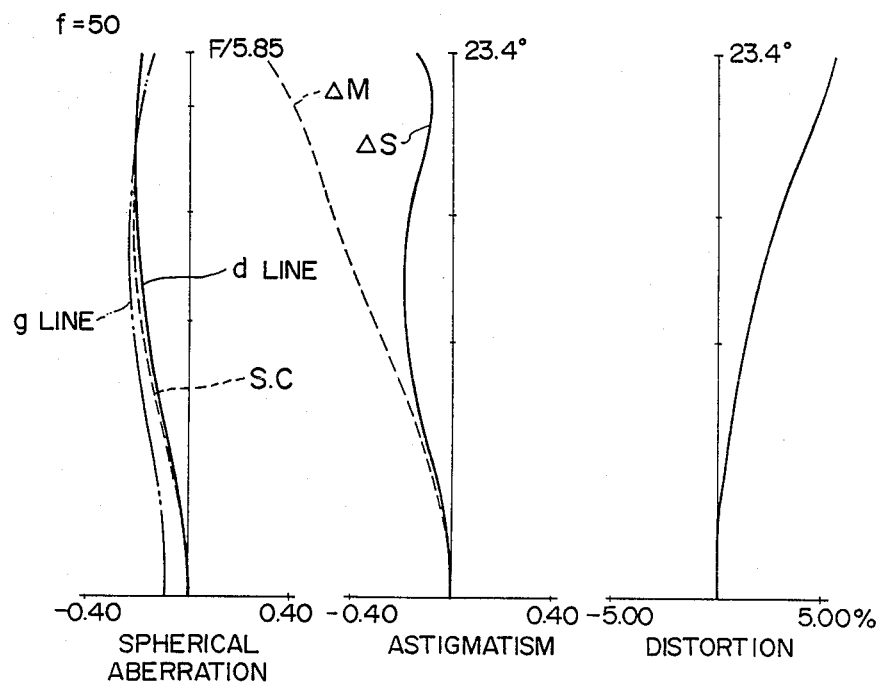
Figure 2C:
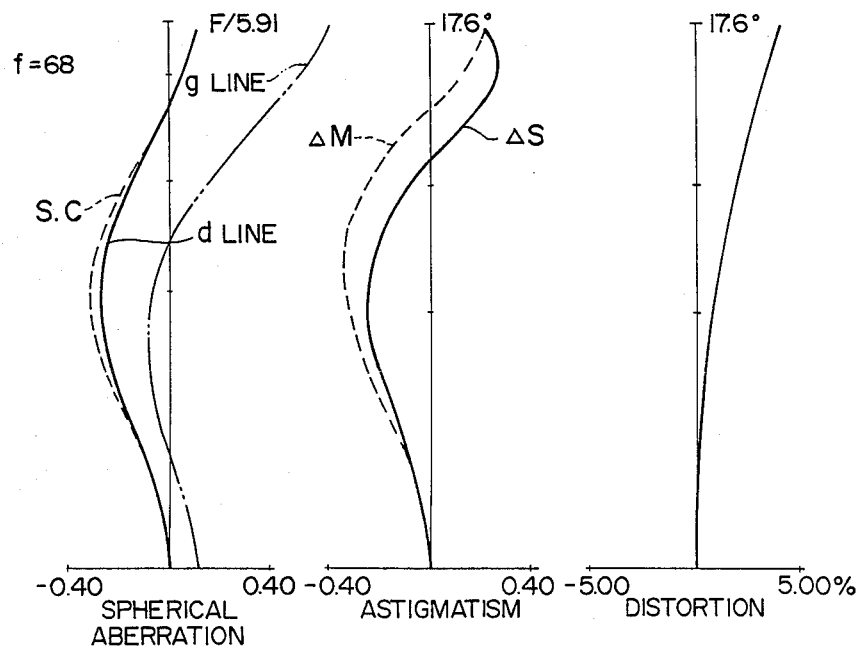
Figure 3A:
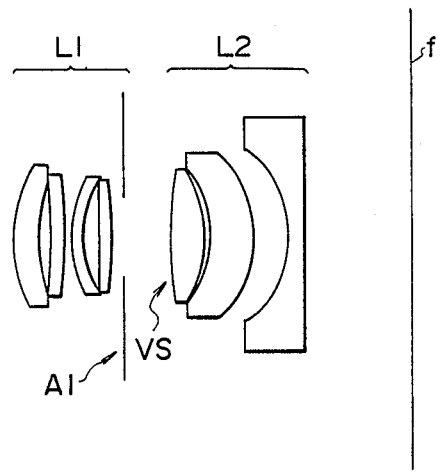
Figure 3B:
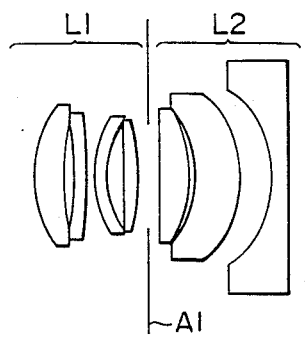
Figure 4A:
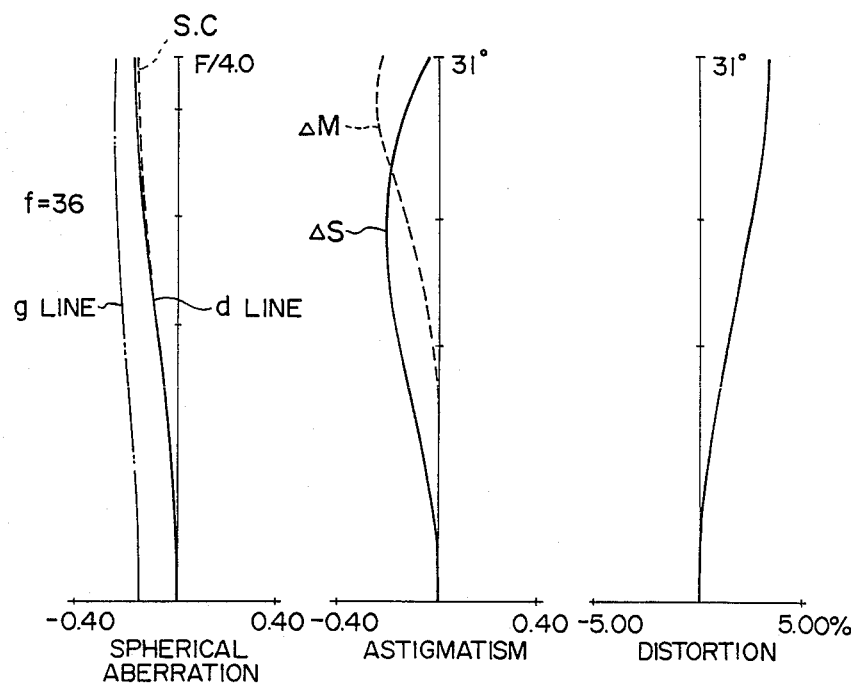
Figure 4B:
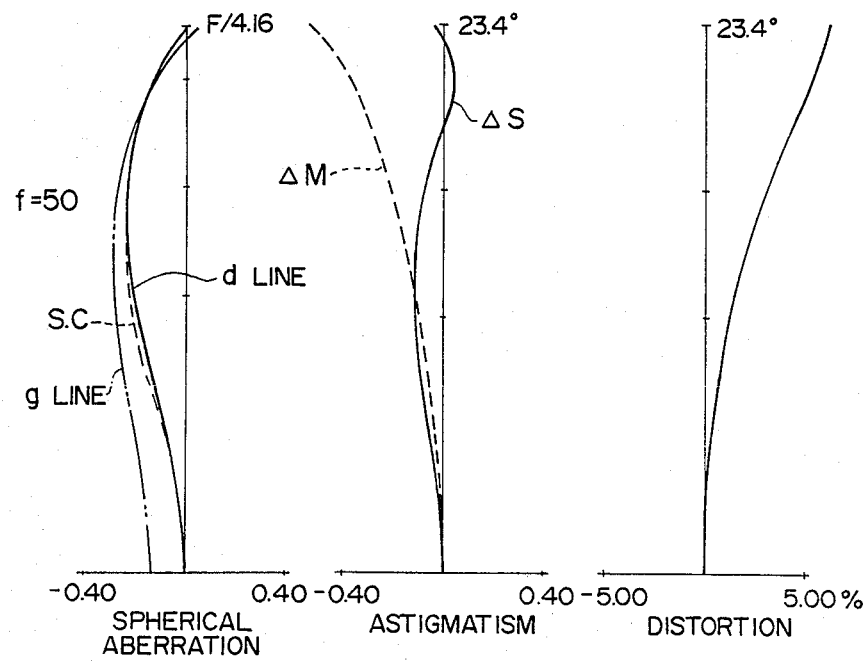
Figure 4C:
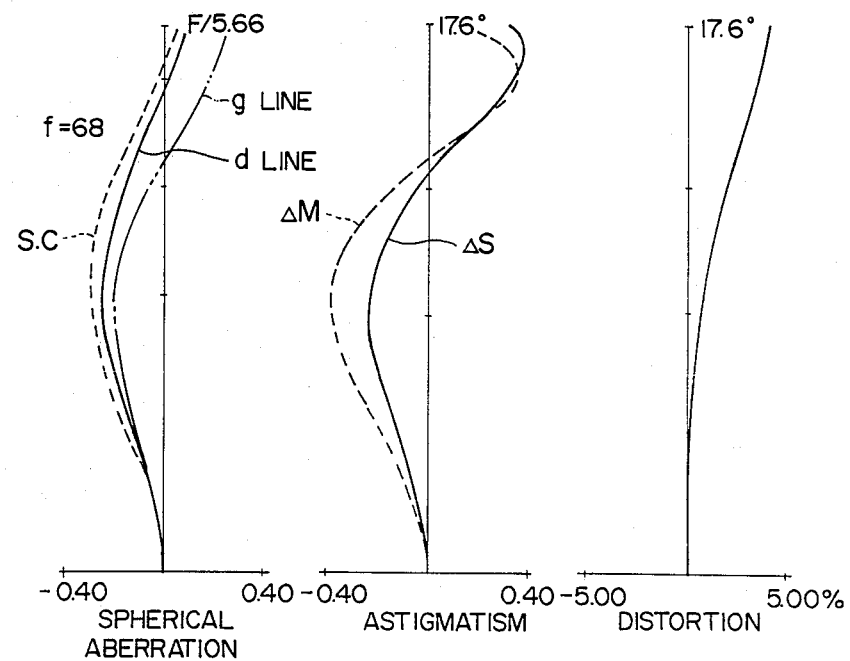
Figure 5A:
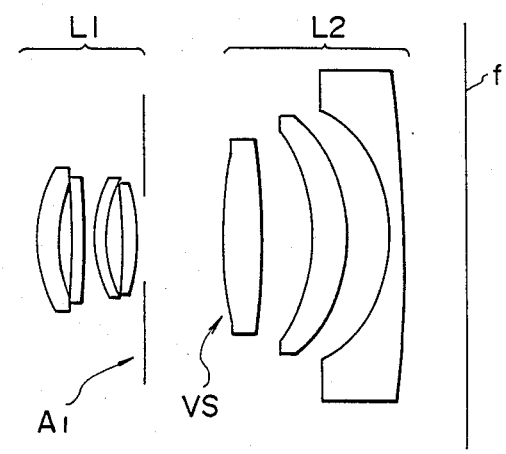
Figure 5B:
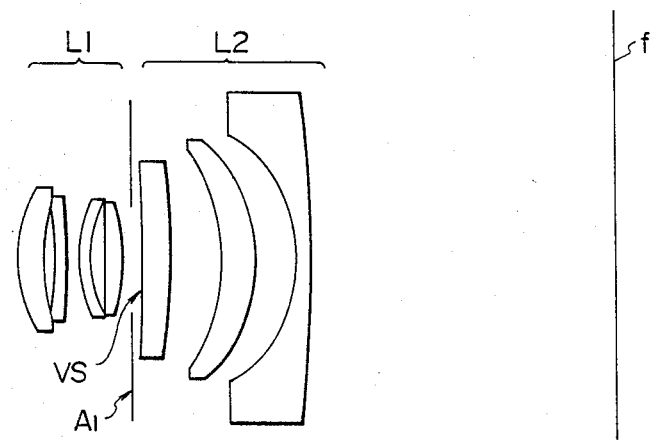
Figure 6A:
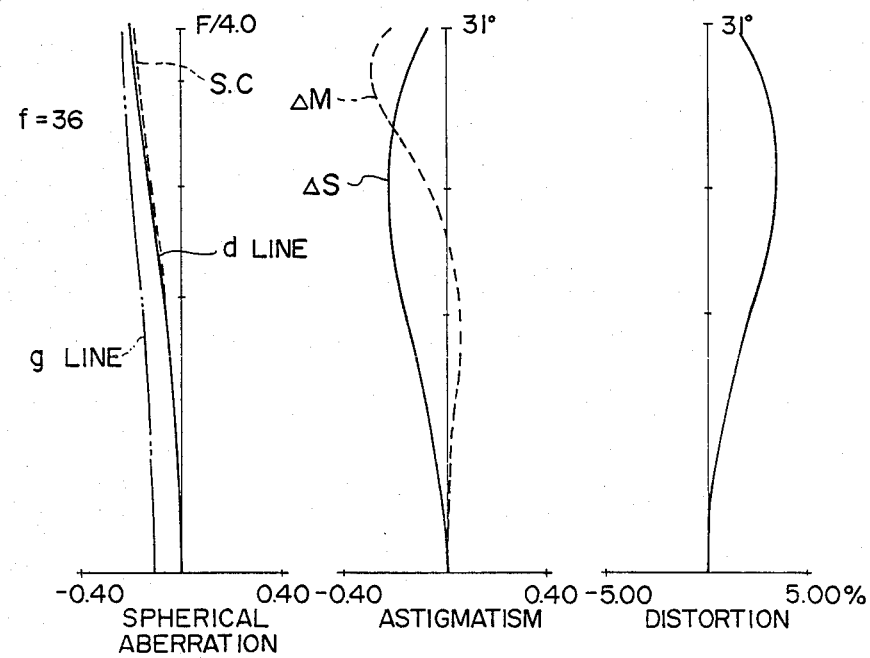
Figure 6B:
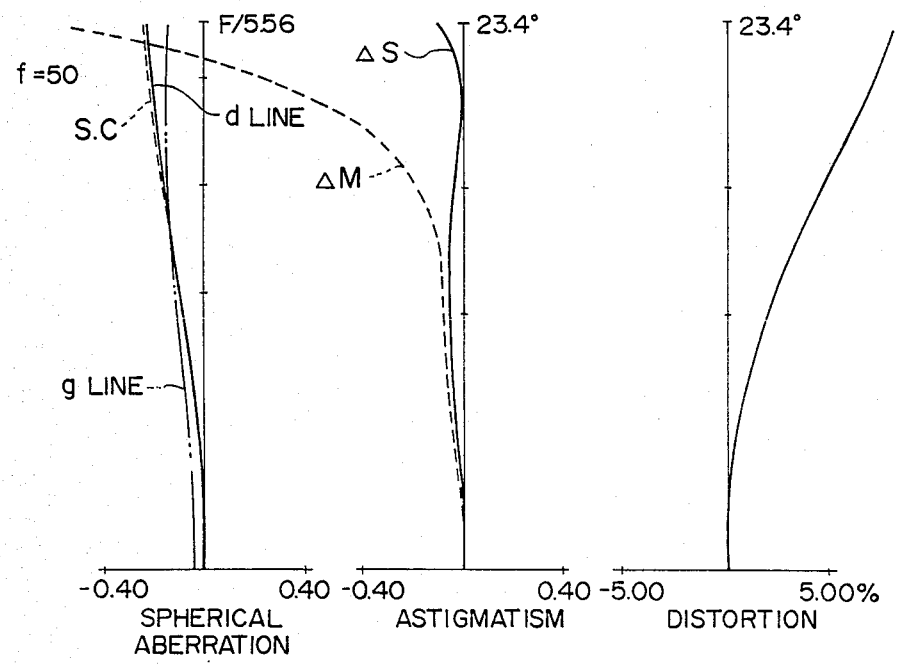
Figure 6C:
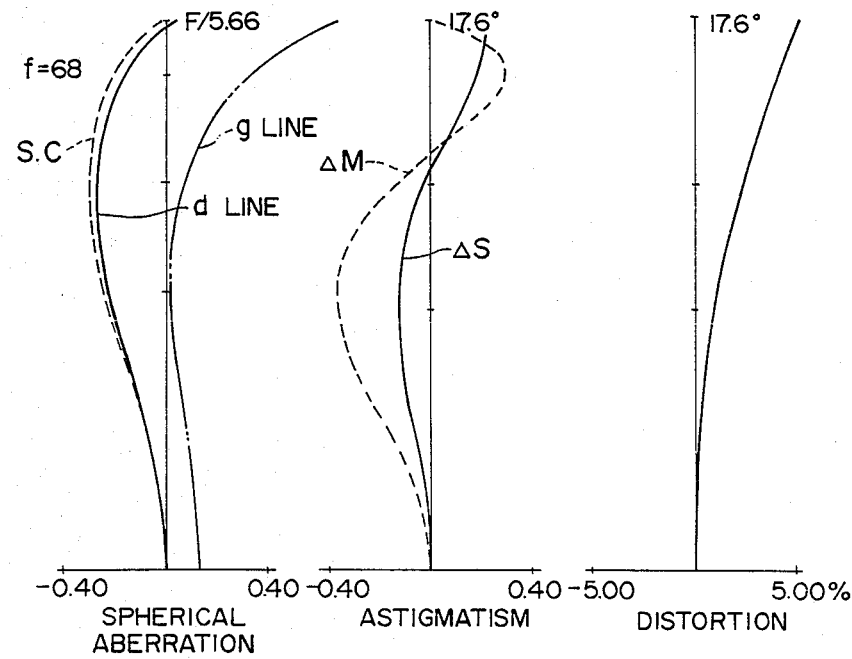
Figure 7A:
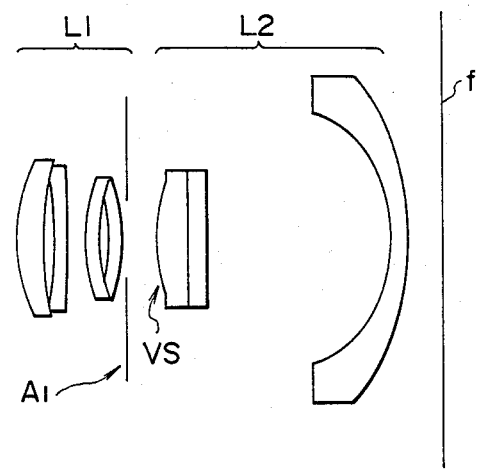
Figure 7B:
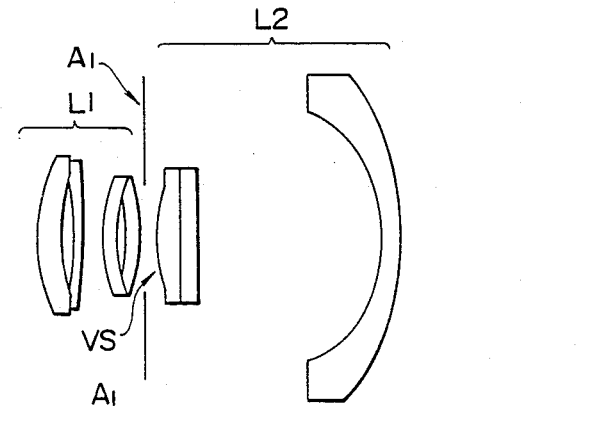
Figure 8A:
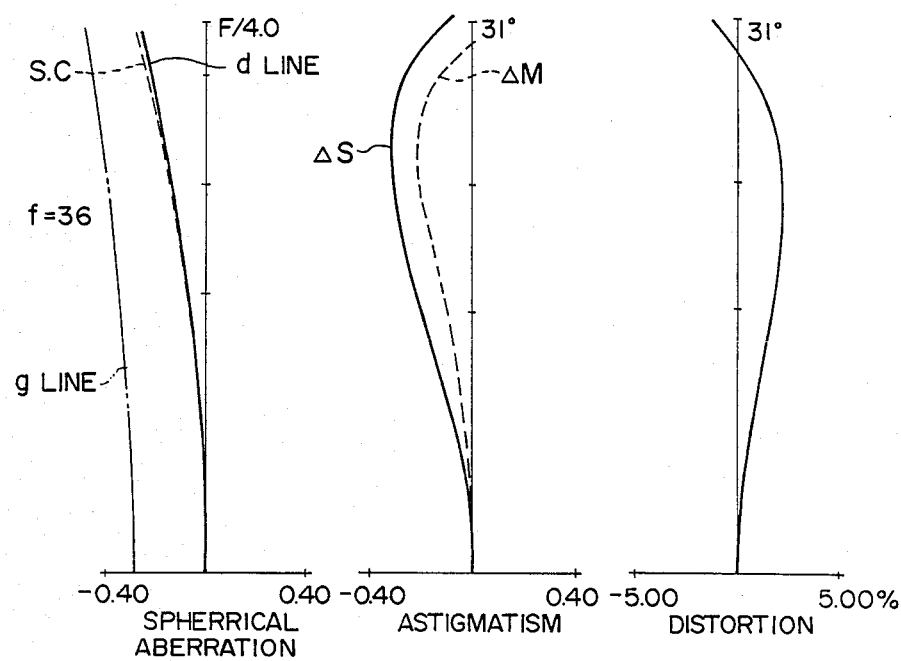
Figure 8B:
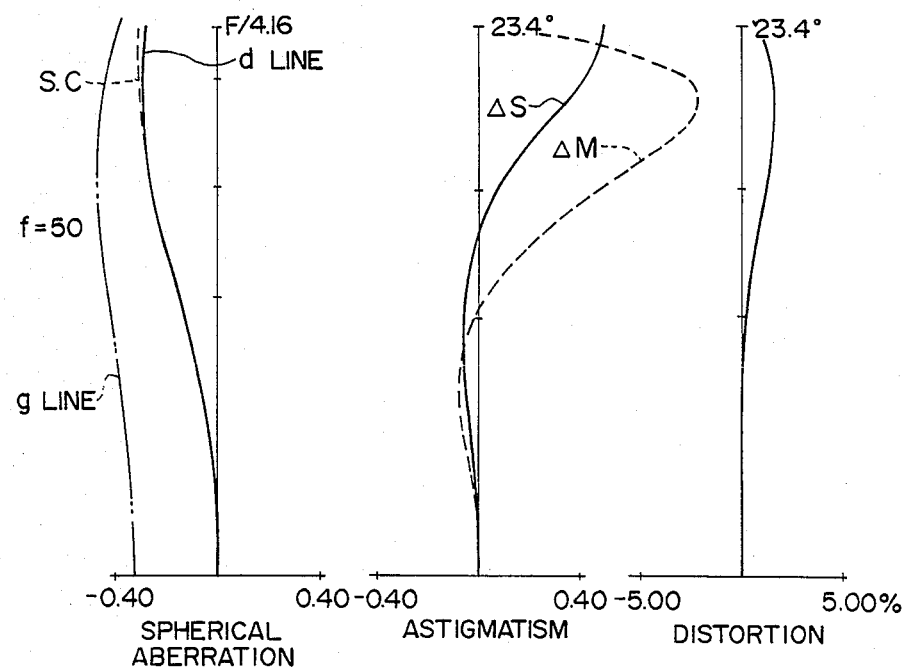
Figure 8C:
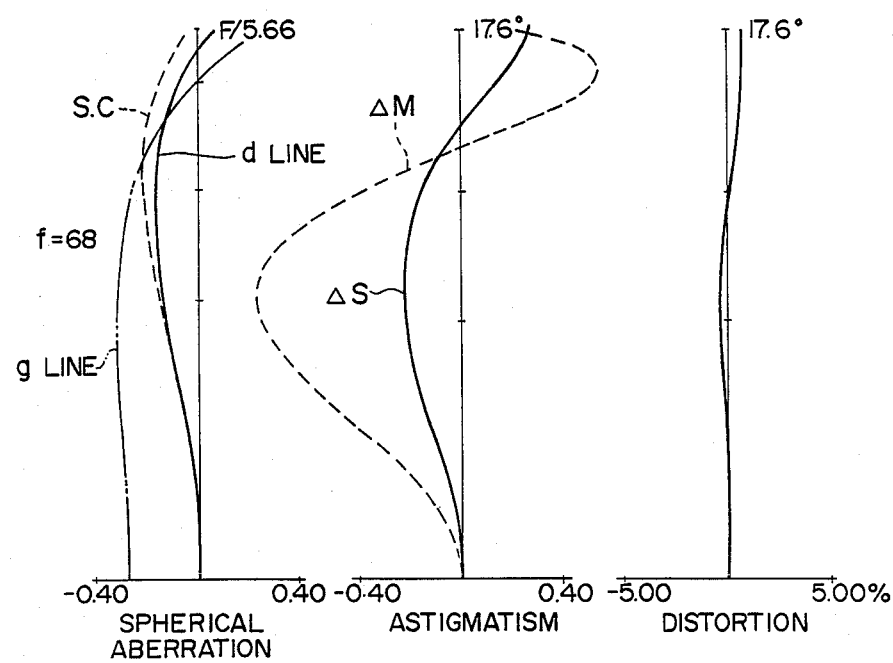

FIGS. 1, 3 and 5, illustrate zoom lens systems each having a forward unit L1 comprised of a positive lens unit and a rearward unit L2 comprised of a lens unit including at least one having a surface with a variable radius of curvature element, and when a change is made from the wide angle end to the telephoto end, each unit is moved independently from the image surface side to the object side and the radius of curvature of said variable surface element is varied, whereby when the power of the rearward unit at the wide angle end is $\phi 2$ and the power of the rearward unit at the telephoto end is $\phi 2 + \Delta\phi 2$, a condition in which $\Delta\phi 2$ is negative is satisfied. The forward unit L1 and the rearward unit L2 are moved in a predetermined relation by a cam mechanism around them and at the same time, the curvature of a lens surface VS also varies.

The aforementioned condition is a condition effective to reduce the amount of movement of the rearward unit when the basic construction of a telephoto type zoom lens is selected. Let it be assumed that the powers of the entire system at the wide angle end and the telephoto end are $\phi W$ and $\phi T$, respectively, the power of the forward unit is $\phi 1$, the power of the rearward unit at the wide angle end is $\phi 2$, the power of the rearward unit at the telephoto end is $\phi 2 + \Delta\phi 2$, and the principal point spacings of the wide angle end and the telephoto end when a variable refractive power lens is disposed are eW and eT, respectively. Also, let it be assumed that the same power arrangement is adopted at the wide angle end and the principal point spacing at the telephoto end which becomes necessary when it is assumed that the power of the rearward unit is not varied during zooming is eT'. Then, the following conditions can be derived:

$$\phi W = \phi 1 + \phi 2 - \phi W \phi 1 \phi 2 \quad (1)$$

$$\phi T = \phi 1 + (\phi 2 + \Delta\phi 2) - eT\phi 1(\phi 2 + \Delta\phi 2) \quad (2)$$

$$\phi T = \phi 1 + \phi 2 - eT'\phi 1\phi 2 \quad (3)$$

Hence, $$eW - eT' = -(\phi W - \phi T)/\phi 1 \phi 2 \quad (>0) \quad (4)$$

$$eW - eT = -\phi W - \phi T)/\phi 1\phi 2 - (1 - eT\phi 1)\Delta\phi 2/\phi 1\phi 2 \quad (>0) \quad (5)$$

and the difference $\Delta$ in the amount of movement of the rearward unit between the case where a variable refractive power lens is used and the case where a variable refractive power lens is not used is the difference between equation (4) and equation (5) because the back focal length of the wide angle end is common, and after all, $$\Delta = (eW - eT) - (eW - eT) \quad (6)$$
$$= (1 - eT\phi 1)\Delta\phi 2/\phi 1\phi 2.$$

If here the basic construction of the telephoto type is a premise, $\phi 1 > 0$ and $\phi 2 < 0$ and $1 - eT\phi 1$ assumes positive value in a construction wherein the object image is not formed in front of the rearward unit and therefore, by making $\Delta\phi 2$ negative, $\Delta > 0$, that is, a reduction in the amount of movement of the rearward lens unit becomes possible.

As will be seen from embodiments which will hereinafter be described, the power $\phi 2$ of the rearward unit at the wide angle end may assume a positive or negative value, but the power $\phi 2 + \Delta\phi 2$ of the rearward unit at the telephoto end assumes a negative value.

As a condition for more effectively making the most of the variable refractive power lens according to the present invention, it is desirable to provide it on that side of the rearward unit which is most adjacent to the object side. That is, generally in the rearward unit, the height of the paraxial pupil light ray is greater on the surfaces nearer to the object and therefore, the effect of increasing a magnification change by a small variation in refractive power is obtained, and since the rearward unit has a great amount of burden of off-axis aberrations such as coma and astigmatism, if the rearward unit is provided at a position nearer to the iris diaphragm, the effect of a variation in power less adversely affects especially the off-axis aberrations. Further, as the conditions under which an optimum imaging performance and compactness are satisfied for the specification of a lens shutter camera, it is desirable that the following conditions be satisfied:

(a) $0.5 < \phi 1/\phi W < 1.2$
(b) $-0.6 < \phi 2/\phi W < 0.2$
(c) $-0.8 < \Delta\phi 2/\phi W < -0.2$ where symbols are similar in significance to those previously used, that is, $\phi 1$ represents the power of the forward unit, $\phi W$ represents the power of the entire system at the wide angle end, $\phi 2$ represents the power of the rearward unit at the wide angle end, and $\Delta\phi 2$ represents the amount of variation in the power of the rearward unit between the wide angle end to the telephoto end.

These formulas are all nomalized by the power at the wide angle end, and formula (a) shows the optimum power of the forward unit. That is, if the lower limit of formula (a) is exceeded, it corresponds to the focal length of the forward unit having become longer and the object point position relative to the rearward unit which governs the magnification change becomes longer toward the image surface, and this leads to the necessity of securing a wide principal point spacing at the wide angle end, with the result that the aperture of the lens most adjacent to the image surface is increased to make it difficult to secure a necessary back focal length. Also, if the upper limit of formula (a) is exceeded, the F-value of the forward unit itself will be increased to deteriorate spherical aberration, and an attempt to overcome this will give rise to the necessity of increasing the number of constituent lenses and increasing the thickness of the forward unit, which in turn will make it difficult to make the lens system compact. Formula (b) also shows the optimum power of the rearward unit at the wide angle end. That is, if the lower limit of formula (b) is exceeded, it corresponds to the relative focal length of the rearward unit becoming shorter and as the entire system, the asymmetric balance will become too strong and therefore, deterioration of coma and bobbin type distortion will become remarkable. Also, if the upper limit of formula (b) is exceeded, the amount of variation in the power of the variable surface shape element which will become necessary must be made very great against the original purpose of shortening the full optical length of the telephoto end, and in that case, the amount of aberrations borne by the variable surface shape element, particularly the amount of fluctuation of spherical aberration and coma resulting from zooming, will be too great to correct. Formula (c) shows the optimum amount of variation in the power of the variable surface shape element. That is, if the upper limit of formula (c) is exceeded, the amount of variation in power will be too small against the original purpose of shortening the full optical length of the telephoto end and therefore, the amount of movement of the rearward unit will be insufficiently reduced and thus, a great effect cannot be obtained in making the lens system compact. If the lower limit of formula (c) is exceeded, the amount of aberrations borne by the variable surface shape element, particularly the amount of fluctuation of spherical aberration and coma, will be great and the correction thereof will become very difficult.

The embodiment has been shown as a zoom lens comprising a forward unit and a rearward unit, but in some cases, a negative fixed unit bearing the power of the rearward unit is provided between the forward and rearward units or on that side of the rearward unit which is adjacent to the image side, as proposed in Japanese Patent Application No. 188585/1984 or Japanese Patent Application No. 188586/1984. Also, in the embodiment, only one refractive index is modified, but alternatively, both surfaces of an element may be modified or more surfaces may be modified.

Figure 9:
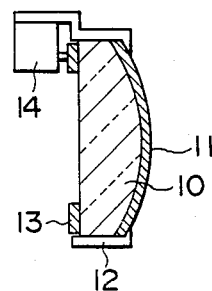
FIG. 9 is a cross-sectional view of a device for changing the power of a variable power lens.

Further, silicon rubber is suitable as the material of the variable surface shape element according to the present invention from the viewpoints of transparency, homogeneity, dynamic characteristic, etc. and therefore, design has been made by the use of the refractive index $nd = 1.4059$ for d-line and $vd = 52.5$. The molding method and driving method for said element are realized by Japanese Laid-Open Patent Application No. 84502/1985, Japanese Laid-Open Patent Application No. 111201/1985, Japanese Laid-Open Patent Application No. 114802/1985, Japanese Laid-Open Patent Application No. 114804/1985, Japanese Laid-Open Patent Application No. 114805/1985 and Japanese Laid-Open Patent Application No. 220301/1985. Referring to FIG. 9 which shows a driving device, a soft elastic material 10 such as silicon rubber is joined to a rigid shell 11 of the same material or a material of similar optical characteristic, and this is supported by a barrel 12. Reference numeral 13 designates a circular ring which is in contact with the marginal edge of the elastic material 10. The circular ring 13 is adapted to be pressed by actuators 14 disposed equiangularly. The elastic material pushed by the circular ring 13 spherically protrudes from an aperture in the circular ring 13, and the refractive power of the elastic material increases.

Where said element is used, the center thickness generally varies, and where a positive power variation, i.e., a convex power, is added as the surface shape, the center thickness increases, and a negative power variation qualitatively involves a converse phenomenon. Accordingly, in the embodiment, with this taken into account, design is made by more or less varying the center thickness of the variable surface shape element.

According to the present invention, as described above, a zoom lens system can be achieved which is suitable for a lens shutter camera in which the full optical length of the telephoto end is short with various aberrations corrected well.

Some embodiments of the present invention will be shown below.

FIG. 1 is a cross-sectional view of a first embodiment of the present invention which satisfies the above-described conditions, and Table 1 shows the lens construction parameters thereof. In FIG. 1, L1 designates a forward unit and L2 denotes a rearward unit, and that surface of the rearward unit L2 which is most adjacent to the object side is constituted by a variable surface shape element. A1 designates an iris diaphragm which determines the F-number, and A2 denotes a flare diaphragm. Describing the construction thereof by the use of the previously used symbols, $\phi W$, $\phi 1$, $\phi 2$ and $\Delta \phi 2$ are selected as follows:

$\phi W = 0.0278$
$\phi 1 = 0.0271$
$\phi 2 = -0.0117$
$\Delta \phi 2 = -0.0153$ and the following values are selected:

$\phi 1/\phi W = 0.98$
$\phi 2/\phi W = -0.42$
$\Delta \phi 2/\phi W = -0.55$

Also, as shown in Table 1, in Embodiment 1, R14 is an aspherical surface and thereby, particularly correction of distortion and astigmatism is accomplished better. The aspherical shape is conveniently expressed by the following equation when the direction of the optic axis is X-axis and the direction perpendicular thereto is Y-axis and the direction from the object toward the image surface is positive and the point of intersection between the surface vertex of the lens and X-axis is the origin and R is the paraxial radius of curvature and A, B, C, D, E, A', B', C' and D' are the aspherical surface coefficients:

$$X = (1/R)Y^2 (1 + \sqrt{1 - (Y/R)^2}) - 1 + AY^2 + BY^4 + CY^6 + DY^8 + EY^{10} + \ldots + A'|Y|^3 + B'|Y|^5 + C'|Y|^7 + D'|Y|^9 + \ldots$$

TABLE 1

Embodiment 1
$F = 36\sim 68$ FNO $= 1:4.15\sim 5.91$ $2w = 62°\sim 35°$

| | | | |
|---|---|---|---|
| R1 = 13.356 | D1 = 2.29 | N1 = 1.77250 | ν1 = 49.6 |
| R2 = 31.466 | D2 = 1.10 | | |
| R3 = −27.378 | D3 = 1.00 | N2 = 1.80518 | ν2 = 25.4 |
| R4 = −91.855 | D4 = 0.91 | | |
| R5 = 14.317 | D5 = 0.95 | N3 = 1.76182 | ν3 = 26.6 |
| R6 = 10.478 | D6 = 1.24 | | |
| R7 = 111.490 | D7 = 1.67 | N4 = 1.54072 | ν4 = 47.2 |
| R8 = −21.430 | D8 = 1.00 | | |
| R9 = iris diaphragm | D9 = variable | | |
| R10 = variable | D10 = variable | N5 = 1.40590 | ν5 = 52.5 |
| R11 = −12.102 | D11 = 0.75 | | |
| R12 = −9.743 | D12 = 3.01 | N6 = 1.59270 | ν6 = 35.3 |
| R13 = −10.067 | D13 = 3.06 | | |
| R14 = aspherical surface | D14 = 1.30 | N7 = 1.60311 | ν7 = 60.7 |
| R15 = −1912.072 | D15 = variable | | |
| R16 = flare diaphragm | | | |

TABLE 1-continued

Embodiment 1
$F = 36\sim 68$ FNO $= 1:4.15\sim 5.91$ $2w = 62°\sim 35°$

| f | f = 36 | f = 50 | f = 68 |
|---|---|---|---|
| R10 | 33.554 | 85.687 | 796.648 |
| D9 | 4.22 | 2.65 | 1.02 |
| D10 | 3.27 | 2.85 | 2.67 |
| D15 | 0 | 9.19 | 21.64 |

Aspherical surface coefficients (14th surface)

A = −1.28910 × 10⁻²    A' = 2.39566 × 10⁻⁴
B = −1.12052 × 10⁻⁴    B' = 4.52586 × 10⁻⁶
C = 1.62802 × 10⁻⁶    C' = −1.38921 × 10⁻⁷
D = −2.28338 × 10⁻⁹    D' = −5.74513 × 10⁻¹⁰
E = 8.03253 × 10⁻¹¹    R = −11.5085

$\phi_w = 0.0278$, $\phi_1 = 0.0271$, $\phi_2 = -0.0117$, $\Delta\phi_2 = -0.0153$
$\phi_1/\phi_w = 0.98$, $\phi_2/\phi_w = -0.42$, $\Delta\phi_2/\phi_w = -0.55$

TABLE 2

Embodiment 2
$F = 36\sim 68$ FNO $= 1:40\sim 5.66$ $2w = 62°\sim 35°$

| | | | |
|---|---|---|---|
| R1 = 14.338 | D1 = 2.54 | N1 = 1.77250 | ν1 = 49.6 |
| R2 = 33.153 | D2 = 1.11 | | |
| R3 = −29.725 | D3 = 1.00 | N2 = 1.80518 | ν2 = 25.4 |
| R4 = −95.448 | D4 = 1.24 | | |
| R5 = 13.408 | D5 = 0.95 | N3 = 1.76182 | ν3 = 26.6 |
| R6 = 10.403 | D6 = 1.30 | | |
| R7 = 116.171 | D7 = 1.64 | N4 = 1.54041 | ν4 = 51.0 |
| R8 = −23.485 | D8 = 1.00 | | |
| R9 = iris diaphragm | D9 = variable | | |
| R10 = variable | D10 = variable | N5 = 1.40590 | ν5 = 52.5 |
| R11 = −12.161 | D11 = 0.79 | | |
| R12 = −9.853 | D12 = 4.25 | N6 = 1.59270 | ν6 = 35.3 |
| R13 = −10.508 | D13 = 3.40 | | |
| R14 = aspherical surface | D14 = 1.40 | N7 = 1.60311 | ν7 = 60.7 |
| R15 = 2379.41 | | | |

Aspherical surface coefficients (14th surface)

A = −1.4938 × 10⁻²    A' = 1.89104 × 10⁻⁴
B = −8.34206 × 10⁻⁵    B' = 2.8779 × 10⁻⁷
C = 3.83099 × 10⁻⁷    C' = −1.15935 × 10⁻⁹
D = 2.19512 × 10⁻⁹    D' = −6.18675 × 10⁻¹⁰
E = −6.82265 × 10⁻¹⁴    R = −12.7343

| f | f = 36 | f = 50 | f = 68 |
|---|---|---|---|
| R10 | 34.916 | 92.968 | 2988.989 |
| D9 | 4.56 | 2.65 | 1.01 |
| D10 | 3.27 | 2.85 | 2.67 |

$\phi_w = 0.0278$, $\phi_1 = 0.0267$, $\phi_2 = -0.0118$, $\Delta\phi_2 = -0.0153$
$\phi_1/\phi_w = 0.96$, $\phi_2/\phi_w = -0.43$, $\Delta\phi_2/\phi_w = -0.55$

TABLE 3

Embodiment 3
$F = 36\sim 68$ FNO $= 1:4.0\sim 5.56$ $2w = 62°\sim 35°$

| | | | |
|---|---|---|---|
| R1 = 15.782 | D1 = 2.43 | N1 = 1.77250 | ν1 = 49.6 |
| R2 = 36.709 | D2 = 1.03 | | |
| R3 = −34.887 | D3 = 1.00 | N2 = 1.80518 | ν2 = 25.4 |
| R4 = −90.237 | D4 = 1.41 | | |
| R5 = 16.553 | D5 = 1.00 | N3 = 1.76182 | ν3 = 26.6 |
| R6 = 12.451 | D6 = 1.19 | | |
| R7 = 389.107 | D7 = 1.48 | N4 = 1.60311 | ν4 = 60.7 |
| R8 = −28.382 | D8 = 1.00 | | |
| R9 = iris diaphragm | D9 = variable | | |
| R10 = variable | D10 = variable | N5 = 1.40590 | ν5 = 52.5 |
| R11 = −52.996 | D11 = 4.73 | | |
| R12 = −19.019 | D12 = 3.34 | N6 = 1.71700 | ν6 = 47.9 |
| R13 = −15.005 | D13 = 4.23 | | |
| R14 = aspherical surface | D14 = 1.60 | N7 = 1.60311 | ν7 = 60.7 |
| R15 = −128.506 | | | |

Aspherical surface coefficients (14th surface)

A = −3.71996 × 10⁻³    A' = 3.40910 × 10⁻⁵
B = −4.55367 × 10⁻⁶    B' = −1.95646 × 10⁻⁶

TABLE 3-continued

Embodiment 3
F = 36~68 FNO = 1:4.0~5.56 2w = 62°~35°

| | | | |
|---|---|---|---|
| C = −1.52837 × 10$^{-7}$ | | C' = −4.98309 × 10$^{-9}$ | |
| D = 5.41664 × 10$^{-9}$ | | D' = −1.80826 × 10$^{-10}$ | |
| E = −7.28195 × 10$^{-14}$ | | R = −14.10555 | |
| f | f = 36 | f = 50 | f = 68 |
| R10 | 44.937 | 383.355 | −204.608 |
| D9 | 7.69 | 5.50 | 1.04 |
| D10 | 4.00 | 3.50 | 3.0 |

$\phi_w = 0.0278$, $\phi_1 = 0.0241$, $\phi_2 = -0.0075$, $\Delta\phi_2 = -0.0148$
$\phi_1/\phi_w = 0.87$, $\phi_2/\phi_w = -0.27$, $\Delta\phi_2/\phi_w = -0.53$

TABLE 4

Embodiment 4
F = 36~68 FNO = 1:4.0~5.66 2w = 62°~35°

| | | | |
|---|---|---|---|
| R1 = 15.941 | D1 = 2.60 | N1 = 1.77250 | ν1 = 49.6 |
| R2 = 32.626 | D2 = 0.90 | | |
| R3 = −36.600 | D3 = 1.00 | N2 = 1.78182 | ν2 = 26.6 |
| R4 = −132.717 | D4 = 2.19 | | |
| R5 = 18.050 | D5 = 1.00 | N3 = 1.76182 | ν3 = 26.6 |
| R6 = 14.093 | D6 = 1.00 | | |
| R7 = −41.950 | D7 = 1.12 | N4 = 1.77250 | ν4 = 49.6 |
| R8 = −24.847 | D8 = 0.60 | | |
| R9 = iris diaphragm | D9 = variable | | |
| R10 = variable | D10 = variable | N5 = 1.40590 | ν5 = 52.5 |
| R11 = 0.0 | D11 = 1.70 | N6 = 1.84666 | ν6 = 23.9 |
| R12 = −626.303 | D12 = 18.14 | | |
| R13 = −13.048 | D13 = 1.60 | N7 = 1.65830 | ν7 = 57.3 |
| R14 = aspherical surface | | | |

$\phi_w = 0.0278$, $\phi_1 = 0.0149$, $\phi_2 = -0.0051$, $\Delta\phi_2 = -0.0158$
$\phi_1/\phi_w = 0.54$, $\phi_2/\phi_w = 0.18$, $\Delta\phi_2/\phi_w = -0.57$

| Aspherical surface coefficients (14th surface) | |
|---|---|
| A = −1.53291 × 10$^{-2}$ | A' = 0 |
| B = −4.72638 × 10$^{-5}$ | B' = 0 |
| C = 3.27066 × 10$^{-7}$ | C' = 0 |
| D = −2.08236 × 10$^{-9}$ | D' = 0 |
| E = 3.52689 × 10$^{-12}$ | R = ∞ |

| f | f = 36 | f = 50 | f = 68 |
|---|---|---|---|
| R10 | 19.994 | 28.198 | 38.570 |
| D9 | 3.10 | 2.30 | 1.49 |
| D10 | 3.00 | 2.50 | 2.00 |

I claim:

1. A zoom lens which is provided with a forward unit having a positive power and a rearward unit including an element having a surface shape which is variable, and wherein from the wide angle end to the telephoto end, said forward unit and said rearward unit are both moved form the image surface side to the object side and at the same time, the radius of curvature of said variable surface is varied, and when the power of said rearward unit at the wide angle end is $\psi 2$ and the power of said rearward unit at the telephoto end is $\psi 2 + \Delta \psi 2$, $\Delta \psi 2$ is negative.

2. A zoom lens according to claim 1, wherein said variable surface element is provided most adjacent to the object side in said rearward unit.

3. A zoom lens according to claim 1, satisfying the following conditions:
 (a) $0.5 < \phi 1/\phi W < 1.2$
 (b) $-0.6 < \phi 2/\phi W < 0.2$
 (c) $-0.8 < \Delta\phi 2 \phi W < -0.2$ where $\phi 1$ is the power of said forward unit, $\phi W$ is the power of the entire system at the wide angle end, $\phi 2$ is the power of said rearward unit at the wide angle end and $\phi 2 + \Delta \phi 2$ is the power of said rearward unit at the telephoto end.

4. A zoom lens according to claim 1, wherein the power $\phi 2 + \Delta \phi 2$ of said rearward unit at the telephoto end is negative 5. A zoom lens according to claim 1, wherein an iris diaphragm which determines the F-number of the entire system is disposed more adjacent to the object side than said variable surface element.

6. A zoom lens that comprises a forward unit having a positive power and a rearward unit including an element having a surface shape which is variable, and wherein from the wide angle end to the telephoto end, said forward unit and said rearward unit are both moved from the image surface side to the object side and at the same time, the radius of curvature of said variable surface is varied wherein, when the power of said rearward unit at the wide angle end is defined as $\Psi 2$ and the power of said rearward unit at the telephoto end is $\Psi 2 + \Delta \Psi 2$, and $\Delta \Psi 2$ is negative wherein, further, the zoom lens also satisfies the following conditions:
 (a) $0.5 < \Psi 1/\Psi W < 1.2$
 (b) $-0.6 < \Psi 2/\Psi W < 0.2$
 (c) $-0.8 < \Delta\Psi 2/\phi W < -0.2$ where $\Psi 1$ is changed as the power of said forward unit and $\Psi W$ is defined as the power of the entire system, at the wide angle end.

* * * * *

UNITED STATES PATENT AND TRADEMARK OFFICE
CERTIFICATE OF CORRECTION

PATENT NO. : 4,874,230  Page 1 of 3
DATED : October 17, 1989
INVENTOR(S) : SHIGEYUKI SUDA It is certified that error appears in the above-identified patent and that said Letters Patent is hereby corrected as shown below:

[56] References Cited (Cover page)

After "4,783,155 11/1988 Imataki et al.......359/423", please insert --FOREIGN PATENT DOCUMENTS

| | | |
|---|---|---|
| 31 09 462 | 4/82 | Germany |
| 34 10 153 | 2/85 | Germany |
| 34 24 068 | 5/85 | Germany-- . |

Column 2

Line 11, "5," should read --5--.

Line 14, "one having" should read --one element having--.

Line 15, "curvature element," should read --curvature,--.

Line 57, "-$\phi W-\phi T$)" should read -- -($\phi W-\phi T$)--.

Column 3

Line 6, "assumes posi" should read --assumes a posi--.

Line 46, "nomalized" should read --normalized--.

UNITED STATES PATENT AND TRADEMARK OFFICE
CERTIFICATE OF CORRECTION

PATENT NO. : 4,874,230

DATED : October 17, 1989

INVENTOR(S) : SHIGEYUKI SUDA

Page 2 of 3

It is certified that error appears in the above-identified patent and that said Letters Patent is hereby corrected as shown below:

Column 4

Line 43, "vd=52.5." should read --$\upsilon$d=52.5.--

Column 6

Line T2, "FNO=1:40~5.66" should read
--FNO= 1:40~5.66--.

Line T2, "R15=2379.41" should read
--R15=2379.411--.

Column 8

Line 2, "form" should read --from--.

Line 5, "$\psi 2$" should read --$\phi 2$--.

Line 7, "$\psi 2+\Delta 2, \Delta\psi 2$" should read --$\phi 2+\Delta\phi 2, \Delta\phi 2$--.

Line 15, "(c) $-0.8<\Delta\phi 2\phi W<-0.2$" should read
--(c) $-0.8<\Delta\phi 2/\phi W<-0.2$--.

Line 37, "$\Psi 2$" should read --$\phi 2$--.

Line 39, "$\Psi 2+\Delta\Psi 2$ and $\Delta\Psi 2$" should read --$\phi 2+\Delta\phi 2$ and $\Delta\phi 2$--.

UNITED STATES PATENT AND TRADEMARK OFFICE
CERTIFICATE OF CORRECTION

PATENT NO. : 4,874,230

DATED : October 17, 1989

INVENTOR(S) : SHIGEYUKI SUDA

It is certified that error appears in the above-identified patent and that said Letters Patent is hereby corrected as shown below:

Column 8

Line 41, "(a) $0.5 < \Psi 1/\Psi W < 1.2$ should read
-- (a) $0.5 < \phi 1/\phi W < 1.2$ --.

Line 42, "(b) $-0.6 < \Psi 2/\Psi W < 0.2$" should read
-- (b) $-0.6 < \phi 2/\phi W < 0.2$ --.

Line 43, "(c) $-0.8 < \Delta \Psi 2/\phi W < -0.2$" should read
-- (c) $-0.8 < \Delta \phi 2/\phi W < -0.2$ --.

Line 45, "system," should read --system--.

Signed and Sealed this

Third Day of November, 1992

*Attest:*

DOUGLAS B. COMER

*Attesting Officer*     Acting Commissioner of Patents and Trademarks